United States Patent
Hsu

(10) Patent No.: US 11,628,897 B2
(45) Date of Patent: Apr. 18, 2023

(54) ANTI-THEFT METHOD FOR ELECTRIC VEHICLE

(71) Applicant: Acer Incorporated, New Taipei (TW)

(72) Inventor: Chu-Hsiang Hsu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/675,678

(22) Filed: Feb. 18, 2022

(65) Prior Publication Data

US 2022/0281545 A1   Sep. 8, 2022

(30) Foreign Application Priority Data

Mar. 4, 2021 (TW) .................. 110107654

(51) Int. Cl.
| | |
|---|---|
| *B62H 5/08* | (2006.01) |
| *B60R 25/04* | (2013.01) |
| *B60R 25/32* | (2013.01) |
| *B60R 25/34* | (2013.01) |
| *B62H 5/20* | (2006.01) |

(52) U.S. Cl.
CPC .............. *B62H 5/08* (2013.01); *B60R 25/04* (2013.01); *B60R 25/32* (2013.01); *B60R 25/34* (2013.01); *B62H 5/20* (2013.01); *B60R 2025/0415* (2013.01)

(58) Field of Classification Search
None
See application file for complete search history.

(56) References Cited

U.S. PATENT DOCUMENTS

| | | | |
|---|---|---|---|
| 2009/0065273 A1 | 3/2009 | Wyatt et al. | |
| 2019/0324446 A1* | 10/2019 | VanderZanden | G05D 1/0291 |

FOREIGN PATENT DOCUMENTS

| | | |
|---|---|---|
| CN | 205417517 U | 8/2016 |
| EP | 2 898 289 A2 | 2/2014 |
| TW | 201408521 A | 3/2014 |
| WO | WO 95/35228 A1 | 12/1995 |

OTHER PUBLICATIONS

Extended European Search Report for European Application No. 22158376.8, dated Aug. 3, 2022.

* cited by examiner

*Primary Examiner* — Kam Wan Ma
(74) *Attorney, Agent, or Firm* — Birch, Stewart, Kolasch & Birch, LLP

(57) ABSTRACT

An anti-theft method for an electric vehicle is provided. The anti-theft method for an electric vehicle includes the following steps. An electronic anti-theft function is activated. Whether the electric vehicle is moving is determined. Whether the temperature of the motor is greater than a critical value is determined. When the temperature of the motor of the electric vehicle exceeds the critical value, the motor is reversed to generate a reverse resistance.

13 Claims, 2 Drawing Sheets

ANTI-THEFT METHOD FOR ELECTRIC VEHICLE

This application claims the benefit of Taiwan application Serial No. 110107654, filed Mar. 4, 2021, the disclosure of which is incorporated by reference herein in its entirety.

TECHNICAL FIELD

The present invention relates in general to an electric vehicle, and more particularly to an anti-theft method for an electric vehicle.

BACKGROUND

Current anti-theft technologies can be divided into mechanic immobilizer and electronic immobilizer according to their structures. A mechanic immobilizer mainly adds an additional lock to the vehicle body. However, when a user goes outside, it is very inconvenient and user unfriendly for the user to carry an additional lock. An electronic immobilizer may be an independent warning device. However, although the warning device is emitting a sound, the thief still can drive the stolen vehicle normally. Hence, the electronic immobilizer does not help much with theft prevention.

Of the electronic anti-theft technologies provided in recent years, the most commonly used method is that when it is detected that a thief is stealing an electric vehicle (such as a scooter), the motor is locked, so that the thief will experience a greater resistance when moving the electric vehicle, and theft is made more difficult. However, once the motor is locked over a long period of time, the temperature of the motor coil will become too high and the motor will be damaged. Hence, this problem needs to be improved further.

SUMMARY

The present invention relates to an anti-theft method for an electric vehicle which generates a motor reverse resistance to increase theft difficulty.

According to one embodiment, an anti-theft method for an electric vehicle is provided. The method includes the following steps. An electronic anti-theft function is activated. Whether the electric vehicle is moving is determined. Whether a temperature of the motor is greater than a critical value is determined. When the temperature of the motor of the electric vehicle exceeds the critical value, the motor is reversed to generate a reverse resistance.

According to another embodiment, an anti-theft method for an electric vehicle is provided. The method includes the following steps. An electronic anti-theft function is activated. Whether the electric vehicle is moving is determined. Whether a temperature of the motor is greater than a critical value is determined. When the temperature of the motor of the electric vehicle exceeds the critical value, an asynchronous electronic angle is provided to the motor for enabling the motor to generate a vibration noise.

The above and other aspects of the invention will become better understood with regard to the following detailed description of the preferred but non-limiting embodiment(s). The following description is made with reference to the accompanying drawings.

Figure 1:
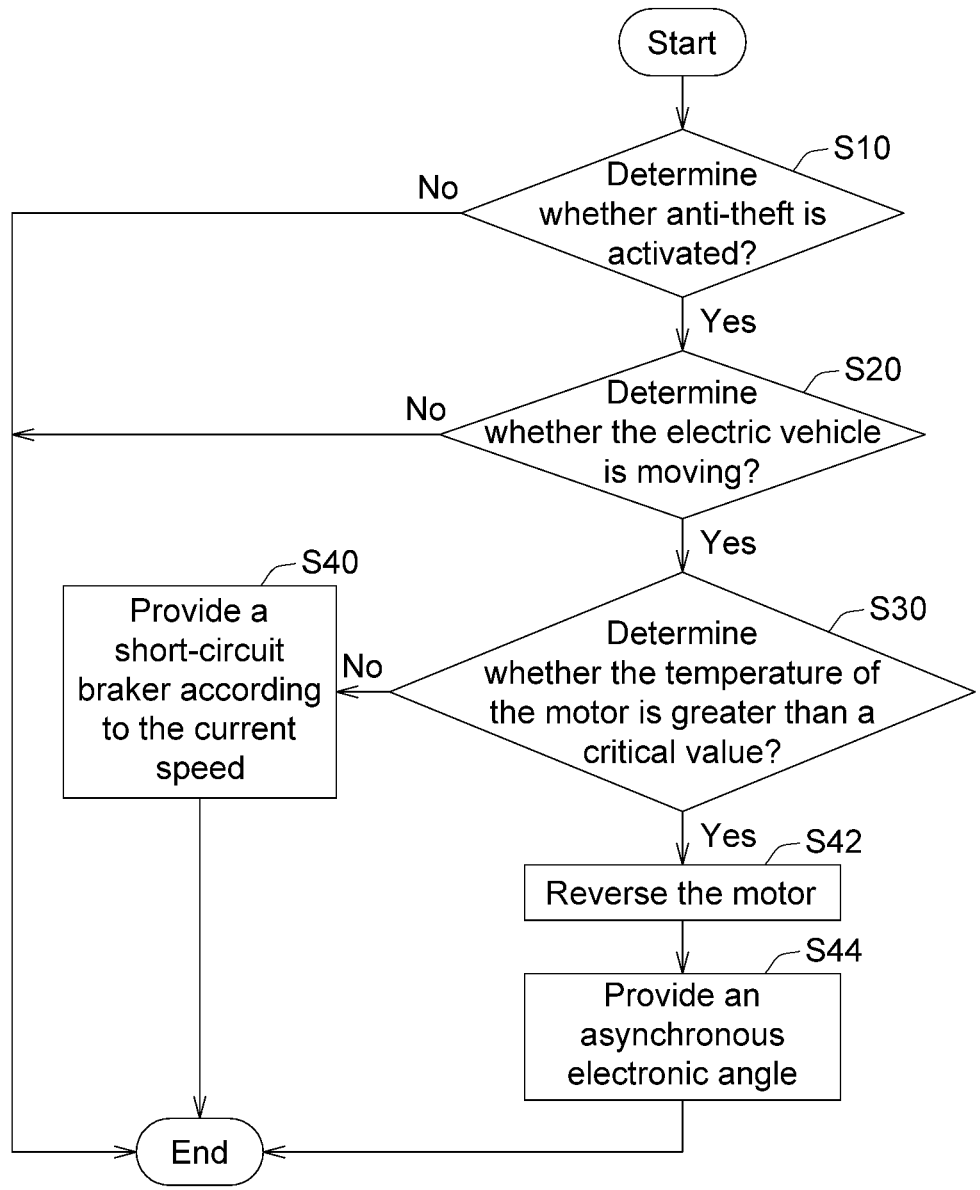
FIG. 1 is a schematic diagram of an anti-theft method for an electric vehicle according to an embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical solutions for the embodiments of the present application are clearly and thoroughly disclosed with accompanying drawings. Obviously, the embodiments disclosed below are only some rather than all of the embodiments of the present invention.

Besides, the disclosed features, structures or characteristics can be combined in one or more embodiments in any suitable way. In the following disclosure, many detailed descriptions are provided for the embodiments of the present application to be better and fully understood. However, anyone ordinarily skilled in the technology field of the invention will understand that technical solution for implementing the present application is not unique. Instead, the present application can be implemented using other methods, devices, or steps. In some circumstances, generally known methods, devices, implementations, or operations are not necessarily or disclosed in greater details lest the aspects of the present application might be distracted.

Referring to FIG. 1, a schematic diagram of an anti-theft method for an electric vehicle according to an embodiment of the present invention is shown. The anti-theft method of the present embodiment prevents theft mainly by way of electric circuits and can be used in light or two-wheeled electric vehicles, such as electric scooters or electric bikes with small size and lightweight.

A control circuit of the electric vehicle of the present embodiment controls the motor to generate a motor reverse resistance and/or motor vibration noise to enhance anti-theft effect, and there is no need to increase any hardware circuit. Refer to FIG. 1. The anti-theft method includes the following steps. In step S10, an electronic anti-theft function is activated. In step S20, whether the electric vehicle is moving is determined. In step S30, whether the temperature of the motor is greater than a critical value is determined. In step S40, when the temperature of the motor of the electric vehicle does not exceed a critical value, a short-circuit braker is provided by the motor according to the current speed. In step S42, when the temperature of the motor of the electric vehicle exceeds a critical value, the motor is reversed to generate a reverse resistance. On the other hand, in step S44, when the temperature of the motor of the electric vehicle exceeds a critical value, an asynchronous electronic angle is provided to the motor for enabling the motor to generate a vibration noise.

The steps S42 and S44 can be determined in the same step, independently operated, combined together or used with other ways. The anti-theft method of the present embodiment can be implemented in several ways, not only one way.

In step S10, anti-theft is done only when the electronic anti-theft function is activated. If the electronic anti-theft function is not activated, the electric vehicle is operated in a normal mode. Electronic anti-theft can be realized by locking the vehicle body, such that the steering wheel of the electric vehicle cannot be rotated, the accelerator pedal cannot be pressed, or the tire brake is locked, and the tires cannot be rotated. The method for implementing the electronic anti-theft of the present embodiment is not unique, and can be implemented in several ways.

In step S20, after the electronic anti-theft function is activated, whether the electric vehicle is moving is determined. The method for determining whether the electric vehicle is moving includes detecting, by a sensor, whether the wheels are rotated or whether the phase of the synchronous motor has changed. If it is determined that the electric vehicle is moving, this indicates theft is happening. To prevent the electric vehicle from being stolen, in step S30, when it is determined that the electric vehicle is moved, whether the temperature of the motor is greater than a critical value is determined.

In step S40, when the temperature of the motor of the electric vehicle does not exceed the critical value, a short-circuit braker can be provided by the motor according to the current speed. In an embodiment, the controller can provide a short-circuit current to the motor for making the three-phase coil of the motor short-circuited and rotating the motor to generates a resistance. Thus, the wheels are locked and cannot be rotated within a short period of time, or the electric vehicle cannot be smoothly moved. Additionally, the motor can set a duty cycle of the short-circuit braker according to the current speed. The duty cycle can be a duty cycle of pulse-width modulation (PWM). By adjusting a ratio of the duration of the pulse signal to the duration of the total pulse cycle, different short-circuit brakers can be obtained.

However, the short-circuit braker consumes the kinetic energy of the motor within the motor. If the braking time is too long, the temperature of the motor may become too high. Although the resistance generated by the short-circuit braker adds difficulty to the theft of an electric vehicle, the temperature of the motor may become too high and cause damage to the motor if the braking time is too long.

In step S42, when the temperature of the motor of the electric vehicle exceeds the critical value, to avoid the temperature of the motor becoming too high and causing damage, the motor no more provides a short-circuit braker and changes the control of the motor to a normal mode. However, the motor needs to be reversed to generate a reverse resistance on the road surface. That is, the rotation direction of the motor changes to be opposite to the moving direction of the electric vehicle, and the wheels generate a reverse resistance on the road surface to stop the electric vehicle moving forwards. Thus, the temperature of the motor will not become too high, meanwhile, the thief cannot smoothly move the electric vehicle, and the anti-theft function of the electric vehicle is enhanced.

On the other hand, in step S44, when the temperature of the motor of the electric vehicle exceeds the critical value, to avoid the temperature of the motor becoming too high and causing damage to the vehicle, the motor no more provides the short-circuit braker but changes to provides an asynchronous electronic angle to the motor for making the motor generate a vibration noise.

The motor of the present embodiment can be made by a permanent magnet synchronous motor (PMSM). The permanent magnet synchronous motor refers to a synchronous motor whose rotor is made of a permanent net instead of winding wires. The motor of the present embodiment can also be made by a DC brushless motor. Thus, the motor of the present embodiment is not limited to unique, and can be implemented in several ways.

To implement the electromagnetic oriented control of the permanent magnet synchronous motor, the rotation of electronic angle and the initial position of the motor rotor must be known. By determining the relation between the angle of the stator current (referred as electronic angle) and the rotor angle and the angle of the stator current is controlled to approach the rotor angle, the permanent magnet synchronous motor can be activated in a normal manner. However, if an asynchronous electronic angle is provided to the motor, the angle of the stator current will not converge to the rotor angle, and the motor will stay in a micro-vibration state and emit a vibration noise. The said asynchronous electronic angle refers to an error angle between the angle of the stator current of the motor and the rotor angle. Meanwhile, the motor controller can provide the error angle to the permanent magnet synchronous motor for enabling the permanent magnet synchronous motor to generate a vibration noise.

Figure 2:
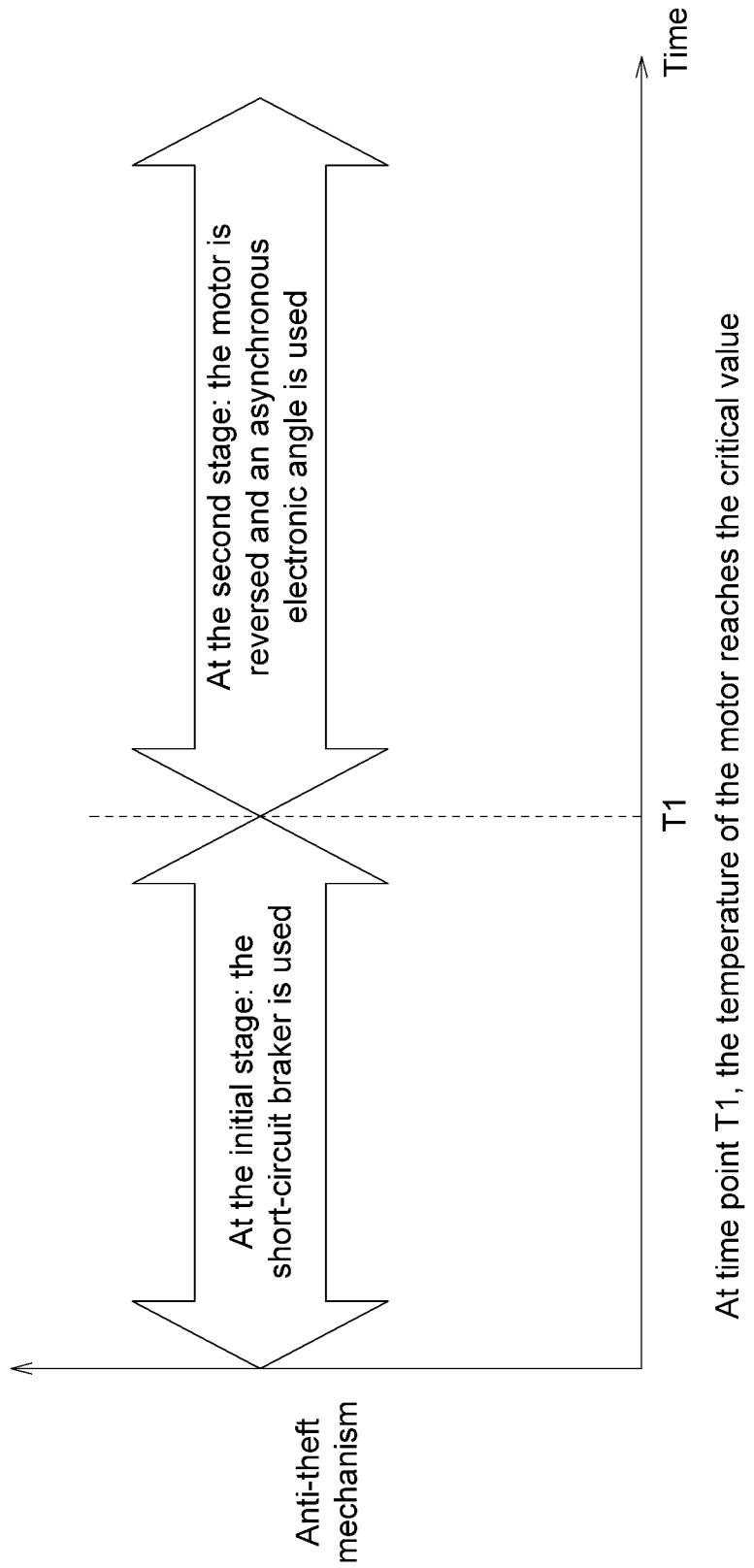
FIG. 2 is a schematic diagram of anti-theft timing of an electric vehicle according to an embodiment of the present invention.

The anti-theft method for an electric vehicle disclosed in the above embodiments of the present invention can be used in light or two-wheeled electric vehicles, such as electric scooters or electric bikes with small size and lightweight to achieve an active anti-theft and deterrence effect. Referring to FIG. 2, a schematic diagram of anti-theft timing of an electric vehicle according to an embodiment of the present invention is shown. At the initial stage, through the design of short-circuit braker, when the thief is moving an electric scooter, the motor will present a certain level of resistance and makes it difficult for the thief to move the electric scooter; at time point T1, if the temperature of the motor is detected to have reached the critical value, the short-circuit braker is stopped. At the second stage, the control of the motor changes to the normal mode, but the motor is reversed to generate resistance, and an asynchronous electronic angle is further used for generating a certain level of resistance and noise, which will attract passersby's attention, making the thief fear and give up.

It will be apparent to those skilled in the art that various modifications and variations can be made to the disclosed embodiments. It is intended that the specification and examples be considered as exemplary only, with a true scope of the present invention being indicated by the following claims and their equivalents.

What is claimed is:

1. An anti-theft method for an electric vehicle including a motor, comprising:
   activating an electronic anti-theft function to disable a vehicle function;
   determining whether the electric vehicle is moving;
   determining whether a temperature of the motor is greater than a critical value when the electronic anti-theft function is activated and the electric vehicle is determined to be moving; and
   when the temperature of the motor of the electric vehicle exceeds the critical value, reversing the motor to generate a reverse resistance.

2. The anti-theft method according to claim 1, further comprising when the temperature of the motor of the electric vehicle exceeds the critical value, providing an asynchronous electronic angle to the motor.

3. The anti-theft method according to claim 1, wherein determining whether the electric vehicle is moving comprises detecting, by a sensor, whether wheels of the electric vehicle are rotated.

4. The anti-theft method according to claim 1, wherein when the temperature of the motor of the electric vehicle does not exceed the critical value, the motor provides a short-circuit braking according to a current speed of the electric vehicle.

5. The anti-theft method according to claim 4, wherein at an initial stage of the anti-theft method, the short-circuit braking is used; when it is detected that the temperature of the motor has exceeded the pre-determined critical value, the short-circuit braking is stopped, and the motor is reversed to generate the reverse resistance.

6. The anti-theft method according to claim 4, wherein a controller supplies a short-circuit current to the motor to generate the short-circuit braking for making a three-phase coil of the motor short-circuited and rotating the motor to generates a resistance, and the motor sets a duty cycle of the short-circuit braking according to the current speed of the electric vehicle.

7. The anti-theft method according to claim 1, wherein reversing the motor comprising rotating the motor in a rotation direction opposite to a moving direction of the electric vehicle.

8. An anti-theft method for an electric vehicle including a motor, comprising:
    activating an electronic anti-theft function to disable a vehicle function;
    determining whether the electric vehicle is moving;
    determining whether a temperature of the motor is greater than a critical value when the electronic anti-theft function is activated and the electric vehicle is determined to be moving; and
    when the temperature of the motor of the electric vehicle exceeds the critical value, providing an asynchronous electronic angle to the motor to generate a vibration noise to attract passersby's attention.

9. The anti-theft method according to claim 8, further comprising:
    when the temperature of the motor of the electric vehicle exceeds the critical value, reversing the motor to generate a reverse resistance; and
    when the temperature of the motor of the electric vehicle does not exceed the critical value, providing a short-circuit braking for the motor according to a current speed of the electric vehicle.

10. The anti-theft method according to claim 9, wherein at an initial stage of the anti-theft method, the short-circuit braking is used, when it is detected that the temperature of the motor has exceeded the pre-determined critical value, the short-circuit braking is stopped, and the motor is reversed to generate the reverse resistance and the asynchronous electronic angle is provided to the motor.

11. The anti-theft method according to claim 9, wherein determining whether the electric vehicle is moving comprises detecting, by a sensor, whether wheels of the electric vehicle are rotated.

12. The anti-theft method according to claim 9, wherein a controller provides a short-circuit current to the motor to generate the short-circuit braking for making a three-phase coil of the motor short-circuited and rotating the motor to generates a resistance and the motor sets a duty cycle of the short-circuit braking according to the current speed of the electric vehicle.

13. The anti-theft method according to claim 9, wherein reversing the motor comprising rotating the motor in a rotation direction opposite to a moving direction of the electric vehicle.

* * * * *